United States Patent
Kang et al.

(10) Patent No.: US 10,275,132 B2
(45) Date of Patent: Apr. 30, 2019

(54) DISPLAY APPARATUS, METHOD OF CONTROLLING DISPLAY APPARATUS, AND RECORDABLE MEDIUM STORING PROGRAM FOR PERFORMING METHOD OF CONTROLLING DISPLAY APPARATUS

(71) Applicant: Samsung Electronics Co., Ltd., Suwon-si, Gyeonggi-do (KR)

(72) Inventors: Dong-goo Kang, Seoul (KR); Ji-yeon Kwak, Seoul (KR); Hyun-jin Kim, Seoul (KR); Yong-yeon Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 14/744,794

(22) Filed: Jun. 19, 2015

(65) Prior Publication Data

US 2016/0034149 A1    Feb. 4, 2016

(30) Foreign Application Priority Data

Jul. 31, 2014    (KR) ........................ 10-2014-0098097

(51) Int. Cl.
| | |
|---|---|
| *G06F 3/041* | (2006.01) |
| *G06F 3/0484* | (2013.01) |
| *G06F 3/0488* | (2013.01) |
| *G06F 3/0485* | (2013.01) |

(52) U.S. Cl.
CPC ........ *G06F 3/04845* (2013.01); *G06F 3/0485* (2013.01); *G06F 3/0488* (2013.01); *G06F 2203/04808* (2013.01)

(58) Field of Classification Search
None
See application file for complete search history.

(56) References Cited

U.S. PATENT DOCUMENTS

| | | | | |
|---|---|---|---|---|
| 7,036,090 B1* | 4/2006 | Nguyen | ................ | G06F 3/0482 348/E5.002 |
| 2003/0197740 A1* | 10/2003 | Reponen | ............... | G06F 3/0362 715/810 |
| 2006/0026521 A1* | 2/2006 | Hotelling | .............. | G06F 3/0418 715/702 |
| 2007/0229472 A1* | 10/2007 | Bytheway | ........... | G06F 3/03547 345/173 |
| 2008/0204423 A1* | 8/2008 | Kim | .................... | G06F 3/04886 345/173 |

(Continued)

OTHER PUBLICATIONS

Korean Office Action dated Jan. 4, 2019, issued in a counterpart Korean application No. 10-2014-0098097.

*Primary Examiner* — Chanh D Nguyen
*Assistant Examiner* — Nguyen H Truong
(74) *Attorney, Agent, or Firm* — Jefferson IP Law, LLP

(57) ABSTRACT

A display apparatus is provided. The display apparatus includes a display unit configured to display a screen including a polygonal object onto which different functions are mapped according to apexes, a detecting unit configured to detect a touch manipulation, and a controller configured, in response to a manipulation by touching one of a plurality of apexes of the polygonal object to rotate the polygonal object, being detected through the detecting unit, to perform a function mapped onto the touched apex.

22 Claims, 16 Drawing Sheets

(56) References Cited

U.S. PATENT DOCUMENTS

| | | | |
|---|---|---|---|
| 2008/0222571 A1* | 9/2008 | Yoshioka | A63F 13/06 715/841 |
| 2010/0201631 A1* | 8/2010 | Taylor | G06F 3/0416 345/173 |
| 2011/0267291 A1* | 11/2011 | Choi | G06F 3/0346 345/173 |
| 2012/0326975 A1* | 12/2012 | Chen | G06F 3/042 345/156 |
| 2013/0019174 A1 | 1/2013 | Gil et al. | |
| 2013/0169549 A1 | 7/2013 | Seymour et al. | |
| 2014/0189559 A1* | 7/2014 | Bleizeffer | G06F 17/30265 715/769 |
| 2014/0344755 A1* | 11/2014 | Shinde | G06F 3/0482 715/834 |
| 2015/0199087 A1* | 7/2015 | Kritt | G06F 3/0482 715/787 |

* cited by examiner

FIG. 2
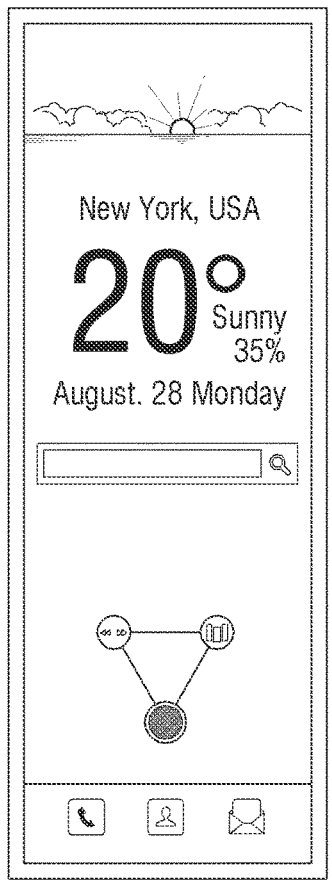
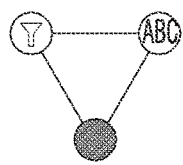
(a)
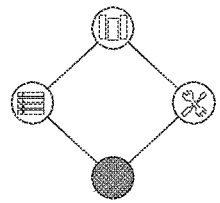
(b)
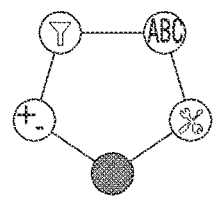
(c)
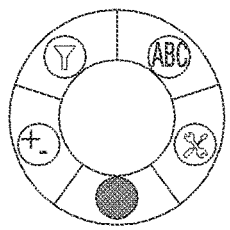
(d)
(e)
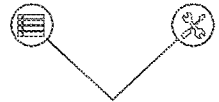
(f)

FIG. 4

| | | | |
|---|---|---|---|
| 41 — ● | • Basic Scroll Button (Scrolling and Navigating current page) | ▽ (46) | • Filtering function (Categorizing Priority) Contact, Music |
| 42 — (+/−) | • Zoom in/out • Volume up/down • Amount Music, Map | ☰ (47) | • Specific Categories Music, Movie, Gallery |
| 43 — (◁◁ ▷▷) | • Page Navigation • Backward/Forward Music, Movie | ↻ (48) | • Previous Page |
| 44 — (ABC) | • Alphabetical Order Contact, Books, Movie | ▯▯▯ (49) | • Application Switch |
| 45 — (RC) | • Recent Call Call, Contact | ✕ (50) | • Option/Setting |

FIG. 5A
FIG. 5B
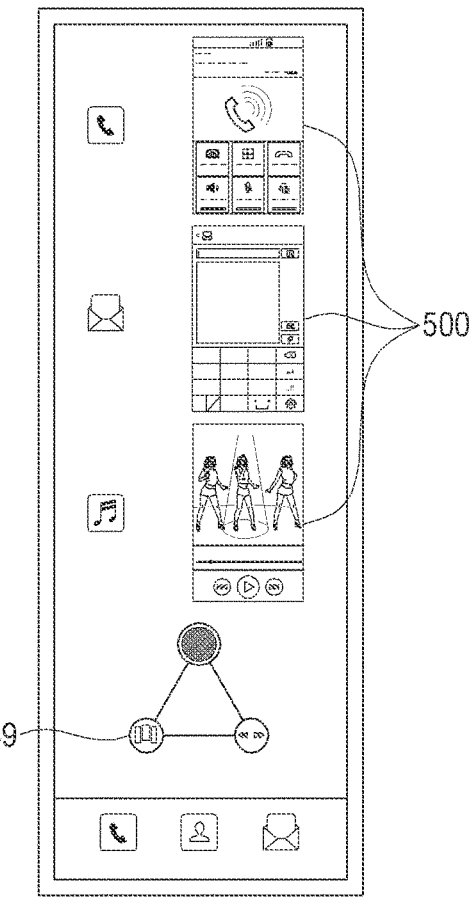

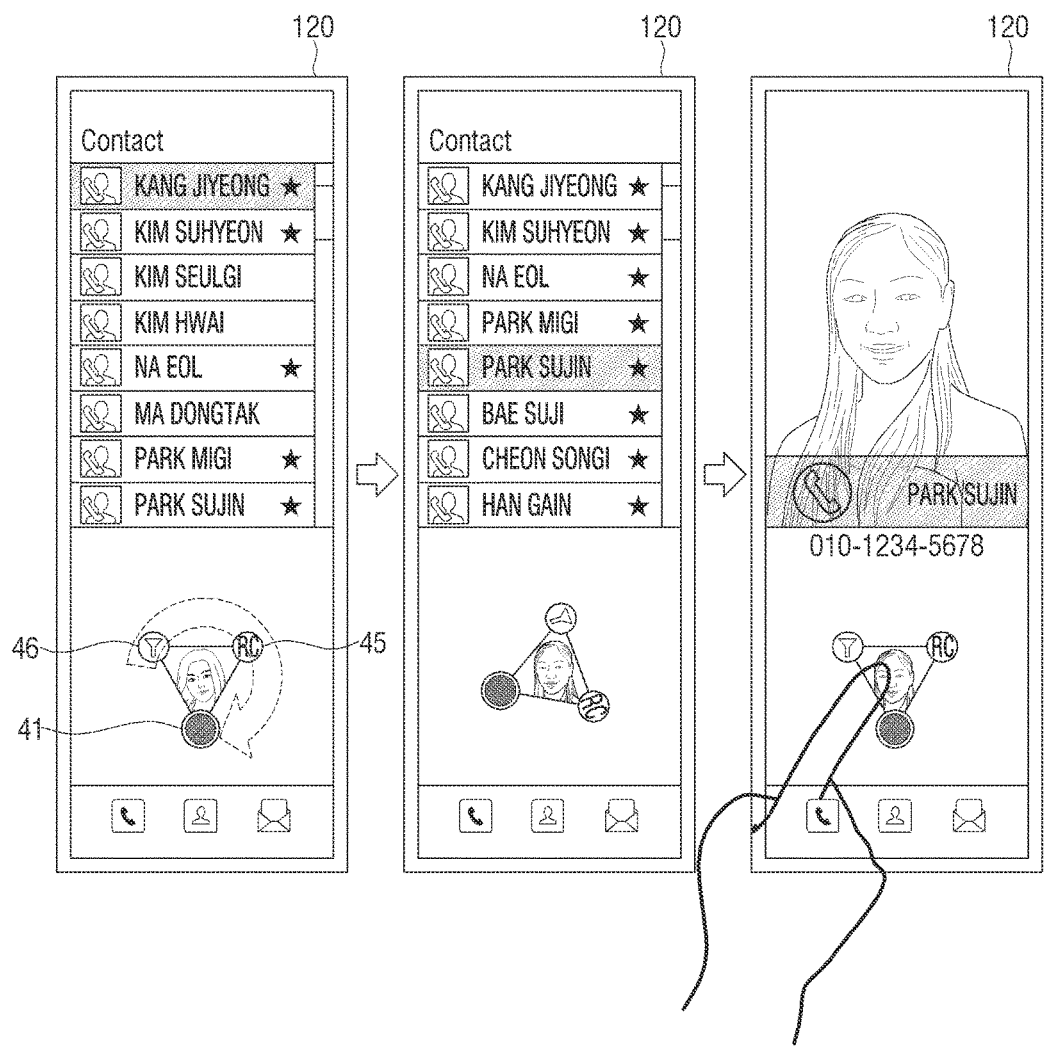

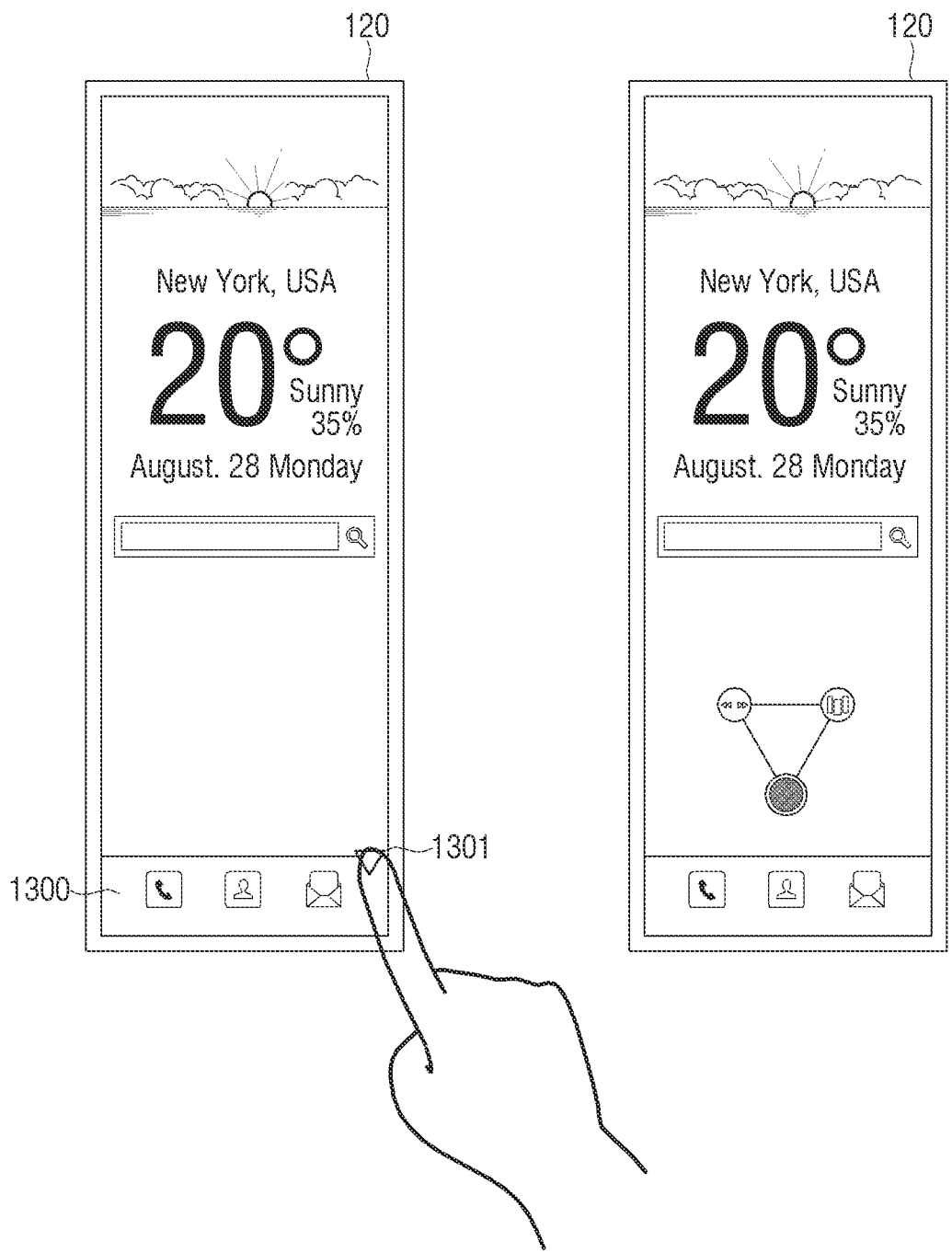

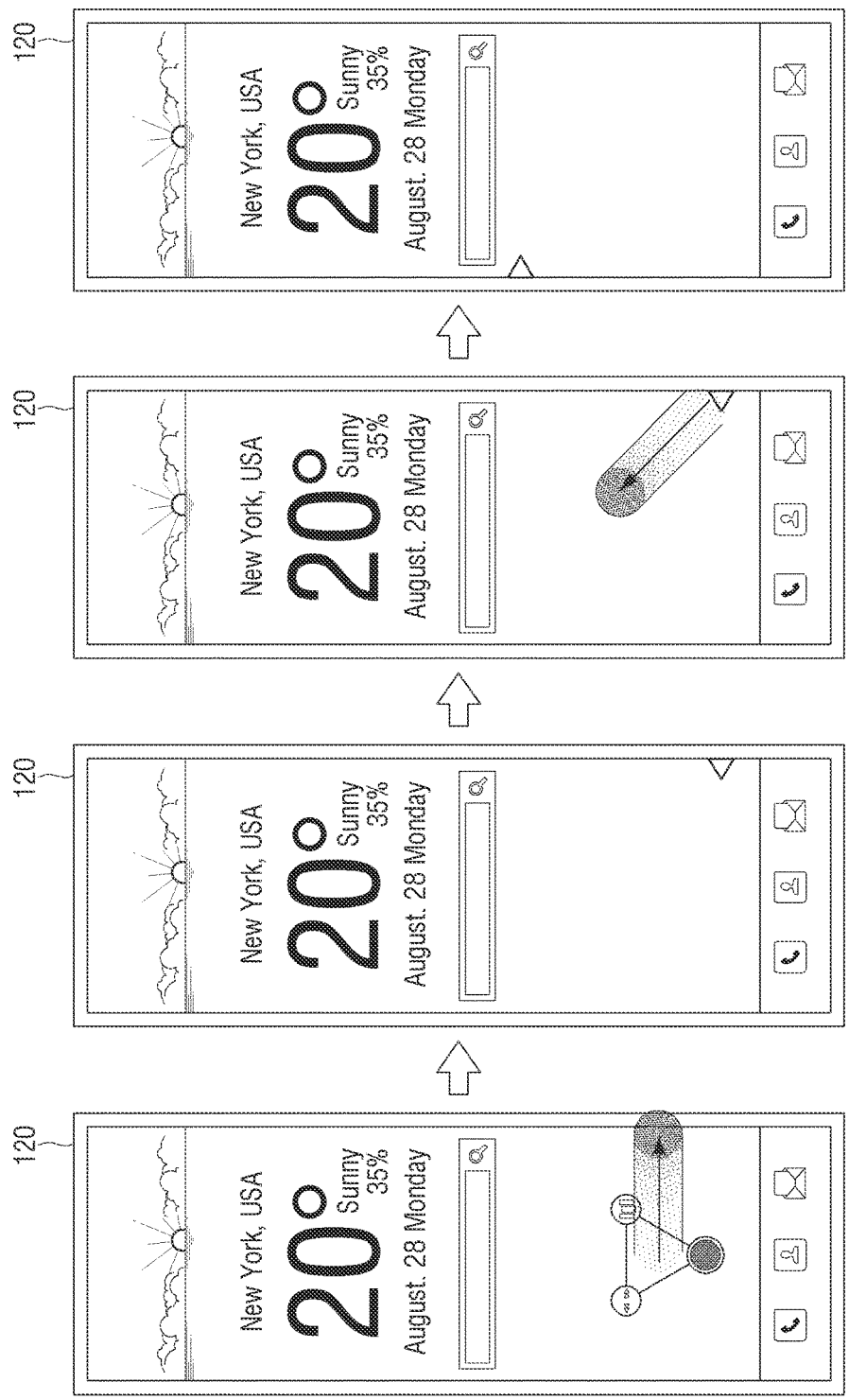

DISPLAY APPARATUS, METHOD OF CONTROLLING DISPLAY APPARATUS, AND RECORDABLE MEDIUM STORING PROGRAM FOR PERFORMING METHOD OF CONTROLLING DISPLAY APPARATUS

CROSS-REFERENCE TO RELATED APPLICATION(S)

This application claims the benefit under 35 U.S.C. § 119(a) of a Korean patent application filed on Jul. 31, 2014 in the Korean Intellectual Property Office and assigned Serial number 10-2014-0098097, the entire disclosure of which is hereby incorporated by reference.

TECHNICAL FIELD

The present disclosure relates to a display apparatus, a method of controlling the display apparatus, and a recordable medium storing a program for performing the method. More particularly, the present disclosure relates to a display apparatus that a user may manipulate with one hand, a method of controlling the display apparatus, and a program for performing the method.

BACKGROUND

The recent development of digital technologies has brought about the development and distribution of various types of electronic products. Among these electronic products, various types of display apparatus, such as a television (TV), a smartphone, a personal computer (PC), a personal digital assistant (PDA), and the like, have been used in most general homes.

More particularly, in modern society, portable devices, such as smartphones, perform functions of performing calls, transmitting characters, and the like, and operate as PCs of users. In general, a portable device uses a touch screen that may perform an input and a display together based on portability.

However, a size of the touch screen has increased with an increase in an amount of information that the portable device will display.

Therefore, it is difficult for a user to manipulate the portable device with holding the portable device with one hand. For example, the user holds the portable device with one hand to scroll a screen with touching the screen with the other hand. More particularly, functions, such as screen zooming in, screen zooming out, and the like, are mainly mapped onto a manipulation of pinching the screen in or out with two fingers, and thus, both hands are necessary for this manipulation.

Therefore, due to such an inconvenience, some people frequently replace new model devices with small old model devices.

Therefore, a need exists for a display apparatus that a user may manipulate with one hand, a method of controlling the display apparatus, and a program for performing the method.

Other aspects, advantages, and salient features of the disclosure will become apparent to those skilled in the art from the following detailed description, which, taken in conjunction with the annexed drawings, discloses various embodiments of the present disclosure.

SUMMARY

Aspects of the present disclosure are to address at least the above-mentioned problems and/or disadvantages and to provide at least the advantages described below. Accordingly, an aspect of the present disclosure is to provide a display apparatus that a user may manipulate with one hand, a method of controlling the display apparatus, and a recordable medium storing a program for performing the method.

In accordance with an aspect of the present disclosure, a display apparatus is provided. The display apparatus includes a display unit configured to display a screen including a polygonal object onto which different functions are mapped according to apexes, a detecting unit configured to detect a touch manipulation, and a controller configured, in response to a manipulation by touching one of a plurality of apexes of the polygonal object to rotate the polygonal object, being detected through the detecting unit, to perform a function mapped onto the touched apex.

The controller may perform a function corresponding to the touched apex, and a rotation direction and a rotation angle of the polygonal object.

In response to a manipulation by of touching and rotating a first apex of the plurality of apexes of the polygonal object, being detected, the controller may scroll the screen in a direction corresponding to the rotation direction.

The screen is a page screen displayed in unit of pages. In response to a manipulation by touching and rotating a first apex of the plurality of apexes of the polygonal object, being detected, the controller may control the display unit to display a previous page screen or a next page screen according to a direction for touching and rotating the first apex.

The screen may include a scrollable list. In response to a manipulation by touching and rotating a first apex of the plurality of apexes of the polygonal object, being detected, the controller may control the display unit to sequentially highlight items included in the scrollable list in a direction corresponding to the rotation direction.

The controller may display an image, which represents the highlighted item, in the polygonal object and, in response to the displayed image being selected, perform a function mapped onto an item corresponding to the selected image.

In response to a first list, which includes all of the items, being displayed and a manipulation by touching and rotating a second apex of the plurality of apexes of the polygonal object, being detected, the controller may control the display unit to change the first list into a second list including a set item.

In response to a manipulation by touching and rotating a second apex of the plurality of apexes of the polygonal object, being detected, the controller may control the display unit to re-arrange items included in the scrollable list according to an arrangement criterion mapped onto the second apex.

In response to a manipulation by touching and rotating a first apex of the plurality of apexes of the polygonal object, being detected, the controller may zoom the screen in or out according to the rotation direction.

In response to a touch manipulation heading from a center of the polygonal object to an outside of the polygonal object, the controller may control the display unit to move the screen according to a direction of the touch manipulation.

The controller may change at least one selected from a size, a color, a transparency, a position, and the number of apexes of the polygonal object, and a function mapped onto the apex according to an application that is currently executed on the display apparatus.

The polygonal object may be a triangle including first, second, and third apexes. The controller may perform a first function in response to a manipulation by touching and rotating the first apex, being detected, perform a second function different from the first function in response to a manipulation by touching and rotating the second apex, being detected, and perform a third function different from the second function in response to a manipulation by touching and rotating the third apex, being detected.

Characters or icons for indicating functions respectively mapped onto the apexes of the polygonal object may be displayed on the apexes of the polygonal object.

In accordance with another aspect of the present disclosure, a method of controlling a display apparatus is provided. The method includes displaying a screen including a polygonal object onto which different functions are mapped according to apexes and in response to a manipulation by touching one of a plurality of apexes of the polygonal object to rotate the polygonal object, being detected, performing a function mapped onto the touched apex.

The performing of the function may include performing a function corresponding to the touched apex, and a rotation direction and a rotation angle of the polygonal object.

The performing of the function may include: in response to a manipulation by touching and rotating a first apex of the plurality of apexes of the polygonal object, being detected, scrolling the screen in a direction corresponding to the rotation direction.

The screen may include a scrollable list. The performing of the function may include: in response to a manipulation by touching and rotating a first apex of the plurality of apexes of the polygonal object, being detected, sequentially highlighting and displaying items included in the scrollable list in a direction corresponding to the rotation direction.

The method may further include: displaying an image, which represents the highlighted item, in the polygonal object, and in response to the displayed image being selected, performing a function mapped onto an item corresponding to the selected image.

The method may further include: in response to a touch manipulation, which heads from a center of the polygonal object to an outside of the polygonal object, being detected, moving and displaying the screen according to a direction of the touch manipulation.

In accordance with another aspect of the present disclosure, a recordable medium storing a program for performing a method of controlling the display apparatus is provided. The method includes displaying a screen including a polygonal object onto which different functions are mapped according to apexes and in response to a manipulation by touching one of a plurality of apexes of the polygonal object to rotate the polygonal object, being detected, performing a function mapped onto the touched apex.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and/or other aspects, features, and advantages of certain embodiments of the present disclosure will be more apparent from the following description taken in conjunction with the accompanying drawings, in which:

FIG. 2 illustrates various polygonal objects that may be displayed on a display unit according to an embodiment of the present disclosure;

FIG. 4 illustrates various functions that may be mapped onto apexes of a polygonal object according to an embodiment of the present disclosure;

FIGS. 5A, 5B, 6A, 6B, 7A, 7B, 8A, 8B, 8C, 9A, 9B, 10A, 10B, 11, 12A, 12B, 13A, 13B, 14A, 14B, 14C, 14D, 15A, and 15B illustrate methods of controlling a display apparatus by using a polygonal object according to various embodiments of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
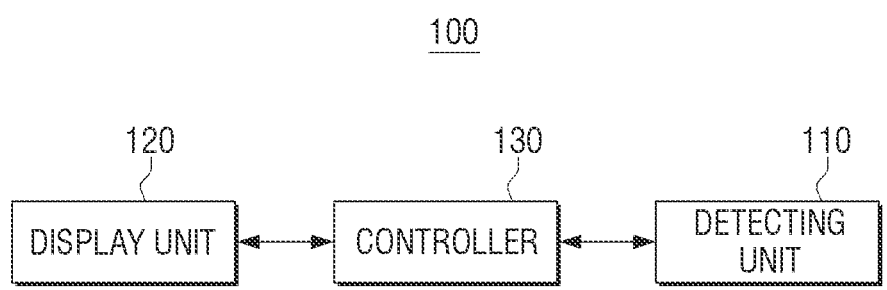
FIG. 1 is a block diagram illustrating a structure of a display apparatus according to an embodiment of the present disclosure.

FIG. 1 is a block diagram illustrating a structure of a display apparatus according to an embodiment of the present disclosure.

Referring to FIG. 1, a display apparatus 100 may be realized as any device including a display unit like a cellular phone, a tablet personal computer (PC), a television (TV), a desktop computer, a Moving Picture Experts Group (MPEG-1 or MPEG-2) Audio Layer 3 (MP3) player, a portable multimedia player (PMP), a remote controller, or the like.

Referring to FIG. 1, the display apparatus 100 includes a detecting unit 110, a display unit 120, and a controller 130.

The detecting unit 110 detects a user manipulation. Specifically, the detecting unit 110 may include a touch sensor to detect the user manipulation. For example, the detecting unit 110 may be realized as a touch screen that is combined with the display unit 120. Here, the user manipulation includes various types of touch manipulations.

Specifically, the touch sensor included in the detecting unit 110 may be realized as a capacitive type or a decompressive type. The capacitive type refers to a method of detecting micro-electricity, which is excited into a body of a user when a part of the body of the user is touched on a surface of the display unit 120, to calculate touch coordinates by using a dielectric coated on the surface of the display unit 120. The decompressive type refers to a method by which two electrode plates are included to detect a current flowing due to a contact between upper and lower plates at a point of a screen touched by a user to calculate touch coordinates. As described above, the touch sensor may be realized as various types.

The detecting unit 110 may include a pressure sensor to detect a touch strength of the user. The pressure sensor may include a piezo film that is installed in the display unit 120 to output an electrical signal corresponding to a size of pressure. If the touch sensor is realized as the decompressive touch sensor, the decompressive touch sensor may also operate as the pressure sensor.

The display unit 120 displays a screen. More particularly, the display unit 120 may display a screen including a polygonal object onto which different functions are mapped according to apexes.

The polygonal object is used to receive a user manipulation, and different functions are mapped onto the apexes of the polygonal object. If a user manipulation is input with respect to the polygonal object, a corresponding function may be performed.

Various examples of the polygonal object that may be displayed on the display unit 120 are illustrated in FIG. 2.

Figure 3:
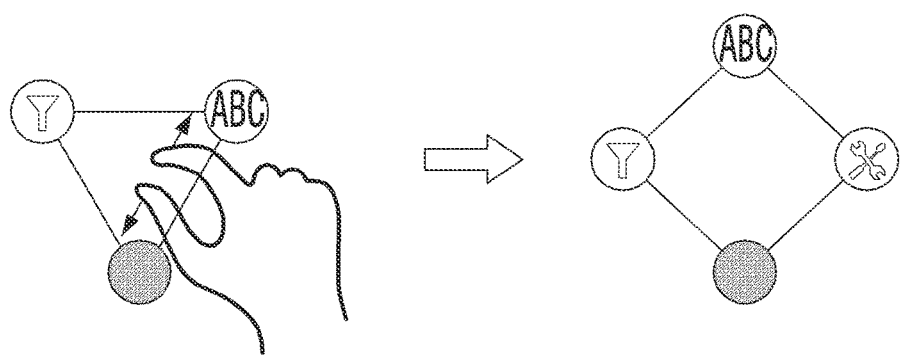
FIG. 3 illustrates a polygonal object that is changed by a user manipulation according to an embodiment of the present disclosure.

FIG. 2 illustrates various polygonal objects that may be displayed on a display unit according to an embodiment of the present disclosure. FIG. 3 illustrates a polygonal object that is changed by a user manipulation according to an embodiment of the present disclosure.

Referring to FIGS. 2 and 3, a polygonal object may be displayed on a side of the display unit 120 and may have a triangular shape (a), a square shape (b), a pentagonal shape (c), or the like. However, an embodiment of the present disclosure is not limited thereto, and thus an object that provides a design appropriate for receiving a user manipulation may not have necessarily a polygonal shape.

For example, as shown in FIG. 2, the polygonal object may be realized as a circular shape (d), and various shapes of objects, such as a propeller shape (e), a boomerang shape (f), and the like, may be displayed on the display unit 120. For convenience of description, only the term "polygonal object" will be used but may not be limited within a scope of the present disclosure.

The polygonal object may be rotated according to a user manipulation, and a displayed position of the polygonal object may be moved and removed on the display unit 120. Alternatively, a shape of the polygonal object may be changed according to a user manipulation. For example, if the user wants to use more many functions that are mapped onto apexes of the polygonal object, the user may increase the number of apexes through a gesture of enlarging the polygonal object.

The number of apexes of the polygonal object may be differently set according to applications and may be changed according to setting of the user.

Various functions matching with the apexes of the polygonal object and a method of controlling the display apparatus 100 by using the various functions will now be described.

The controller 130 controls an overall operation of the display apparatus 100. The controller 130 may execute an operating system (O/S) or various types of applications stored in a memory installed in the display apparatus 100 to control operations of pieces of hardware installed in the display apparatus 100 and support various functions. More particularly, the controller 130 analyzes various types of signals detected by the detecting unit 110 to determine an intention of the user and perform an operation corresponding to the intention of the user.

Specifically, if a manipulation of touching one of a plurality of apexes of the polygonal object to rotate the polygonal object is detected through the detecting unit 110, the controller 130 may perform a function mapped onto the touched apex.

Characters or icons for indicating functions respectively mapped onto the apexes may be displayed on the apexes of the polygonal object.

FIG. 4 illustrates various functions that may be respectively mapped onto apexes according to an embodiment of the present disclosure.

Referring to FIG. 4, for example, if a manipulation of touching an apex 41 for scrolling to rotate the apex 41 in a clockwise direction is detected through the detecting unit 110, the controller 130 may scroll down a screen currently displayed on the display unit 120 and, if a manipulation of rotating the apex 41 in a counterclockwise direction is detected, scroll up the screen.

If a manipulation of touching an apex 42 for a volume adjustment to rotate the apex 42 in a clockwise direction is detected through the detecting unit 110, the controller 130 may turn up a volume of a currently played media content and, if a manipulation of rotating the apex 42 in a counterclockwise direction is detected, turn down the volume of the currently played media content. As another example, the apex 42 may be used to adjust the volume, zoom a screen in and out, and input amount. The input of the amount indicates that if an account transfer application is executed on the display apparatus 100, and a manipulation of touching and rotating the apex 42 is input, the controller 130 may increase or decrease a transfer amount.

If a screen displayed on the display unit 120 is a page screen on which a screen is displayed in the unit of pages, and a manipulation of touching an apex 43 for a page movement to rotate the apex 43 in a clockwise direction is detected through the detecting unit 110, the controller 130 may change the screen from a current page into a next page. In addition, if a manipulation of rotating the apex 43 in a counterclockwise direction, the controller 130 may change the screen into a previous page. Alternatively, the apex 43 may be used to fast-forward and rewind a media content. In addition, if an e-book is executed, the user may move to a previous page and a next page by using the polygonal object.

If a list including a plurality of items is displayed on the display unit 120, and a manipulation of touching and rotating an apex 44 for an item arrangement is detected, the controller 130 may re-arrange the items of the list in an alphabetic order and display the re-arranged items on the display unit 120. In this case, if a rotation direction is a clockwise direction, the controller 130 may control the display unit 120 to sequentially highlight the items downwards from the list after the list is arranged. If the rotation direction is a counterclockwise direction, the controller 130 may control the display unit 120 to sequentially highlight the items upwards from the list.

If the display apparatus 100 is a portable phone, and a manipulation of touching and rotating an apex 45 for displaying a list of recent calls is input when an application for contacts is executed, the controller 130 may change the screen into the list of recent calls.

If a manipulation of touching and rotating an apex 46 for filtering is detected when the list including the plurality of items is displayed on the display unit 120, the controller 130 may control the display unit 120 to change the list including the plurality of items into a list including a set item. Here, the set item may be bookmarked item.

If a manipulation of touching and rotating an apex 47 for a category arrangement is detected when an application for outputting a media content, such as a movie, music, a photo, or the like, is executed, the controller 130 may re-arrange contents according to an arrangement criterion mapped onto the apex 47. The arrangement criterion may include a criterion for arranging contents according to dates or genres.

If a manipulation of touching and rotating an apex 48 for cancelling is detected, the controller 130 may display a previous screen or end an application. For example, if a current web browser is executed on the display apparatus 100, the screen may be moved into a previous web page through the apex 47.

If a plurality of applications are currently executed on the display apparatus 100, and a manipulation of touching and rotating an apex 49 for an application switch is detected, the controller 130 may control the display unit 120 to display a list including items indicating the executed applications and sequentially highlight the items of the list according to a rotation direction. An embodiment of the present disclosure will now be described with reference to FIGS. 5A and 5B.

FIGS. 5A, 5B, 6A, 6B, 7A, 7B, 8A, 8B, 8C, 9A, 9B, 10A, 10B, 11, 12A, 12B, 13A, 13B, 14A, 14B, 14C, 14D, 15A, and 15B illustrate methods of controlling a display apparatus by using a polygonal object according to various embodiments of the present disclosure.

Referring to FIGS. 5A and 5B, if a manipulation for touching and rotating the apex 49 for the application switch is input as shown in FIG. 5A, a list 500 of applications that are currently being executed may be displayed as shown in FIG. 5B.

If a manipulation of touching and rotating an apex 50 for displaying a function menu is detected, the controller 130 may control the display unit 120 to display function menus, which are provided from an application currently displayed and executed on the display unit 120, on a side of the display unit 120.

As described above, apexes onto which various functions are mapped may be combined to be appropriate for a characteristic of an application that is currently executed on the display apparatus 100 and a function that may be provided by the application, so as to form a polygonal object.

Detailed applications of a polygonal object for controlling the display apparatus 100 will now be described.

Figure 6A:
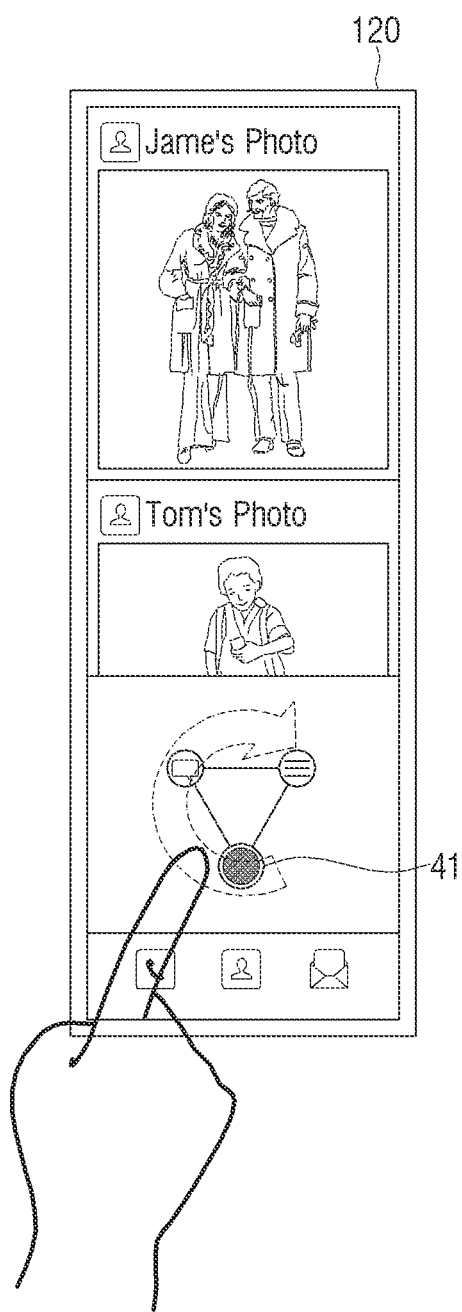
Figure 6B:
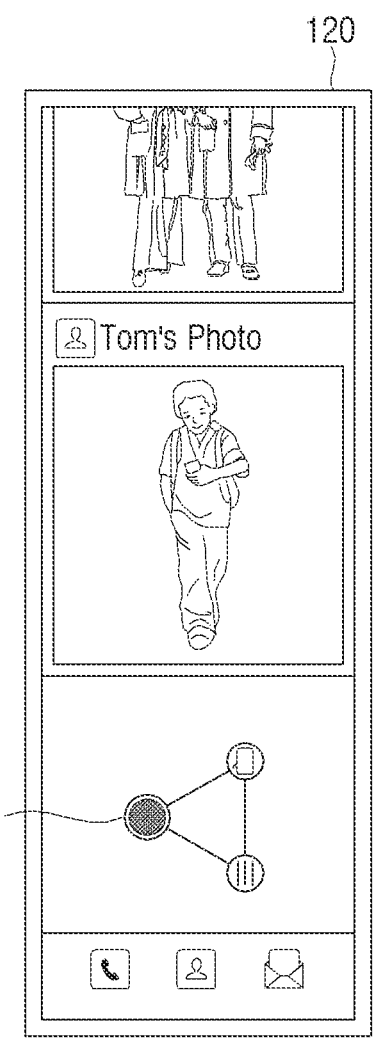

FIGS. 6A and 6B illustrate a method of controlling a display apparatus by using a polygonal object according to an embodiment of the present disclosure.

Referring to FIGS. 6A and 6B, if a manipulation of touching an apex 41 for scrolling a screen to rotate the apex 41 in a clockwise direction is detected through the detecting unit 110, the controller 130 may scroll up a screen that is displayed downwards on the display unit 120 and thus is not displayed on the display unit 120. On the contrary, if a manipulation of rotating the apex 41 in a counterclockwise direction is detected, the screen may be scrolled down. In this case, a scroll bar may be displayed at an edge of the screen to indicate a scroll position of the screen.

According to an embodiment of the present disclosure, the controller 130 may perform a corresponding function based on a touched apex, a rotation direction of a polygonal object, and a rotation angle of the polygonal object.

Figure 7A:
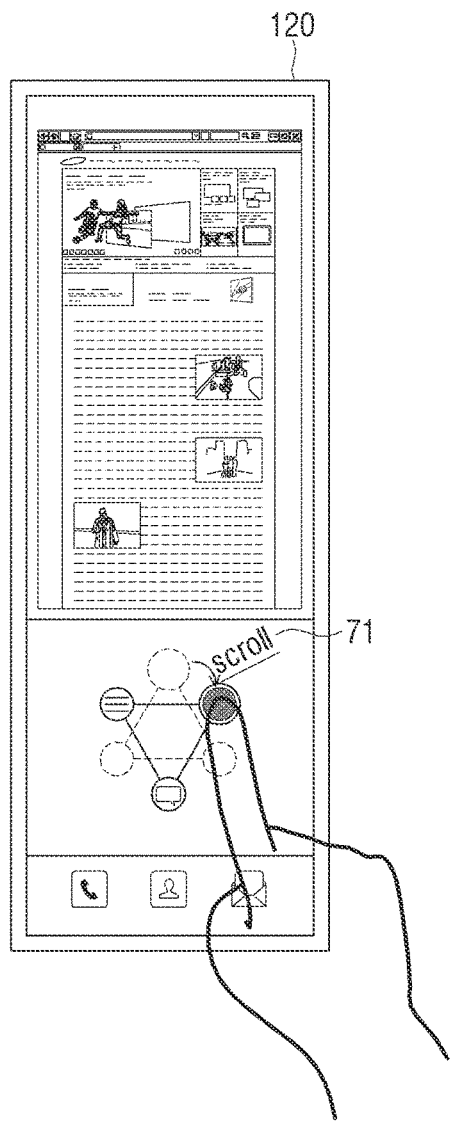
Figure 7B:
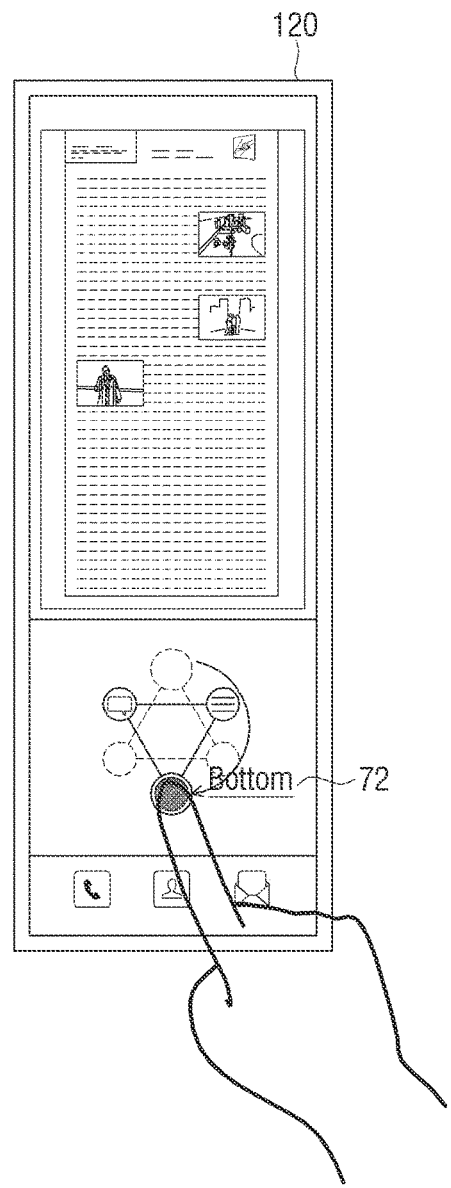

FIGS. 7A and 7B illustrate a method of controlling a display apparatus by using a polygonal object according to an embodiment of the present disclosure.

Referring to FIG. 7A, if it is detected that a polygonal object is rotated at 30°, the controller 130 may perform screen scrolling. In this case, the user may keep a touch state at about 30° to scroll the screen at a constant speed without continuously rotating the polygonal object.

Referring to FIG. 7B, if it is detected that the polygonal object is rotated at about 180°, the controller 130 may perform scrolling to the bottom of the screen at a time.

In this case, when a rotation angle reaches a set angle as shown in FIGS. 7A and 7B, a text or an image indicating a function that may be performed at the set angle may be displayed on the display unit 120. As shown in FIG. 7A, when the detecting unit 110 detects a rotation angle of the polygonal object as about 30°, the controller 130 may display a text 71 "scroll" and, if the rotation angle exceeds about 30°, remove the text 71 "scroll". When the polygonal object is continuously rotated to enable the rotation angle thereof to be about 180°, the controller 130 may display a text 72 "bottom" indicating that scrolling may be performed to the bottom of the screen as shown in FIG. 7B.

Besides these, various functions may be performed according to rotation angles. As another example, if a media content is executed on the display apparatus 100, and the polygonal object is rotated at a first angle, the controller 130 may play the media content at a double speed. If the polygonal object is rotated at a second angle wider than the first angle, the controller 130 may play the media content at a quadruple speed.

Alternatively, if the screen displays a list, a navigation speed of an item included in the list may be adjusted according to a rotation angle. In addition, if the polygonal object is rotated at the first angle when a camera application is executed, an effect of half-opening an aperture may be reproduced. If the polygonal object is rotated at the second angle wider than the first angle, an effect of fully opening the aperture may be reproduced.

Very various functions may be performed by using a rotation angle of the polygonal object according to an application type as described above.

According to another embodiment related to screen scrolling, the display apparatus 100 may include a vibrator (not shown). If the polygonal object is rotated to enable the screen to be scrolled to the bottom or the top, the controller 130 may enable the polygonal object not to be rotated any more although a rotation manipulation is continuously detected. Simultaneously with this, the controller 130 may control the vibrator to output weak vibrations. In other words, the user may feel as if being bumped into somewhere and thus perceive that scrolling of the screen is not performed any more. In addition, through this effect, the display apparatus 100 may sensuously transmit a message to the user.

Alternatively, the display apparatus 100 may change a color of the polygonal object to sensuously transmit a message to the user. For example, if a manipulation of touching and rotating an apex of the polygonal object is detected, the controller 130 may adjust a volume of a currently played content and make the color of the polygonal object gradually redly displayed in proportion to an increase in the volume. Since a red color generally refers to a danger, the user may receive a message indicating that the volume should be turned down to protect hearing, through the red color.

FIGS. 8A, 8B, and 8C illustrate a method of controlling a display apparatus by using a polygonal object according to another embodiment of the present disclosure.

Referring to FIGS. 8A, 8B, and 8C, when a screen including a scrollable list is displayed on the display unit 120, an item included in the scrollable list may be navigated, selected, or filtered through a user manipulation of a polygonal object.

If a manipulation of touching an apex 41 for scrolling to rotate the polygonal object is detected through the detecting unit 110, the controller 130 may control the display unit 120 to sequentially highlight items, which are included in the list, in a direction corresponding to a rotation direction of the polygonal object. In other words, referring to FIG. 8A, when "Kang Jiyeong" is highlighted according to a rotation manipulation, "Kim Suyeon", "Kim Seulgi", . . . may be sequentially highlighted.

The controller 130 may display an image, which represents a highlighted item, in the polygonal object. As shown in FIG. 8A, a photo of "Kang Jiyeong" which is highlighted may be displayed. In this case, if the polygonal object is rotated at a speed higher than or equal to a set rotation speed or at a set angle or more, an item navigation of a list may be performed at a relatively fast speed. In addition, the controller 130 may control the display unit 120 to display only an image, which represents a finally navigated item, without displaying images representing navigated items in the polygonal object one by one.

Alternatively, if an image displayed in the polygonal object is not changed when a manipulation of touching and rotating an apex of the polygonal object is detected, and then stopping of the manipulation is detected, the controller 130 may display an image, which represents an item highlighted at the stopping time of the manipulation, in the polygonal object.

If a manipulation of touching and rotating an apex 46 for item filtering is detected, the controller 130 may control the display unit 120 to display a list including only an item that is set from a list including all of items as shown in FIG. 8B. FIG. 8B illustrates a contact number that is bookmarked in a phone directory and filtered.

If a manipulation of touching and rotating an apex 45 for displaying a recent call list is detected, the controller 130 may change a phone directory screen into a recent call list screen and display the recent call list screen.

If an image is selected when an image representing a highlighted item is displayed in the polygonal object, a function mapped onto an item corresponding to the selected image may be performed. As shown in FIG. 8C, if image of "Park Sujin" is selected, a function of making a phone call to "Park Sujin" may be performed. In this case, if a touch on the image is detected once, a phone call making function may be performed. If touches on the image are detected consecutively two times, a message detecting function may be performed. In other words, various functions may be performed according to various touch manipulations of an image displayed in the polygonal object.

An image displayed in the polygonal object may be a movie poster, an album jacket, a singer's photo, or the like in an application for outputting a media content. If the image is selected, a corresponding content may be output. An embodiment of the present disclosure related to the application for outputting the media content is illustrated in FIGS. 9A and 9B.

Figure 9A:
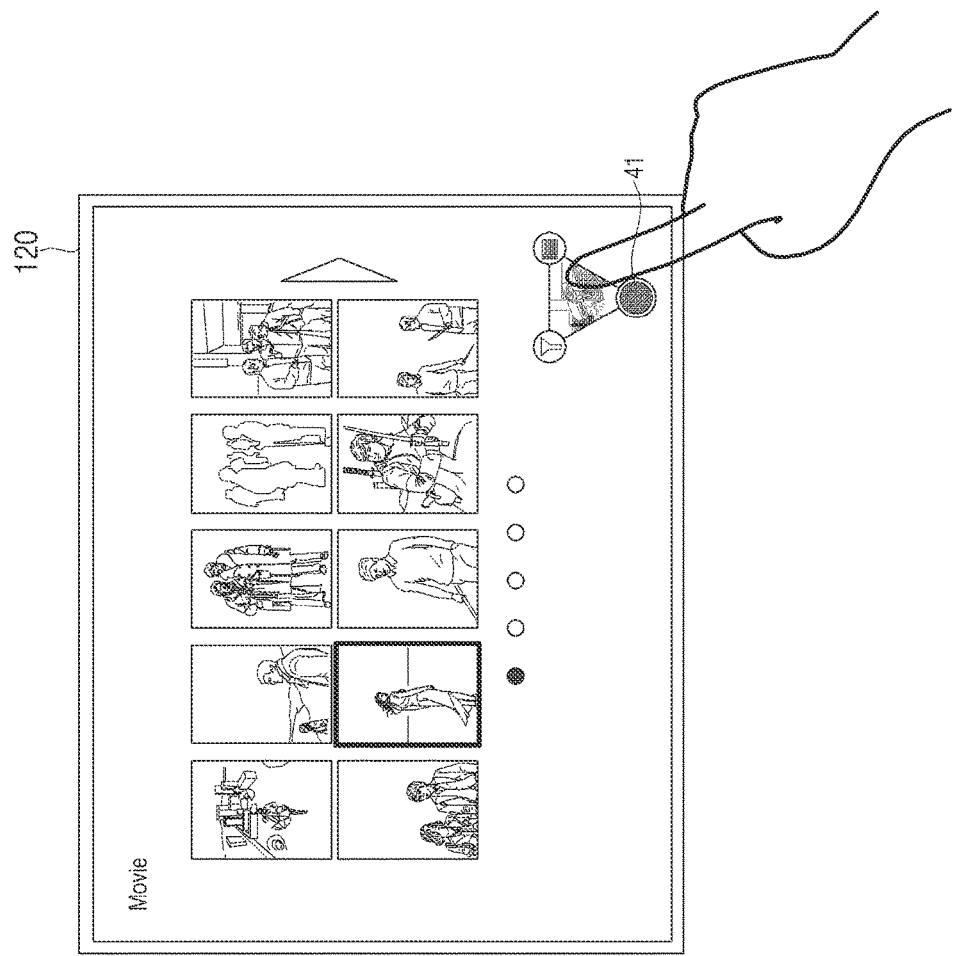
Figure 9B:
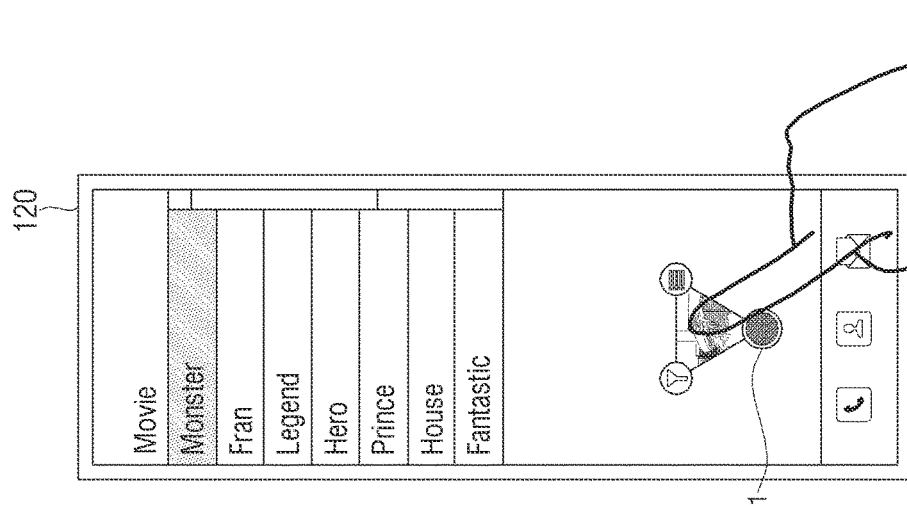

FIGS. 9A and 9B illustrate a method of controlling a display apparatus by using a polygonal object according to another embodiment of the present disclosure.

Referring to FIG. 9A, a list of media contents stored in the display apparatus 100 may be navigated by using a polygonal object. If an image displayed in the polygonal object is selected, a corresponding media content may be executed.

If the image displayed in the polygonal object is touched, the controller 130 may play a preview image of a corresponding media content in the polygonal object. If the touch on the image is performed for a set time or more, a full image of a media content may be played.

A list of items may be displayed in a form as shown in FIGS. 8A, 8B, and 9A or in a thumbnail form as shown in FIG. 9B. Referring to FIG. 9B, if a manipulation of touching an apex 41 for scrolling to rotate the polygonal object is detected, the controller 130 may control the display unit 120 to sequentially highlight thumbnail images from the left side to the right side or from top to bottom.

Figure 10A:
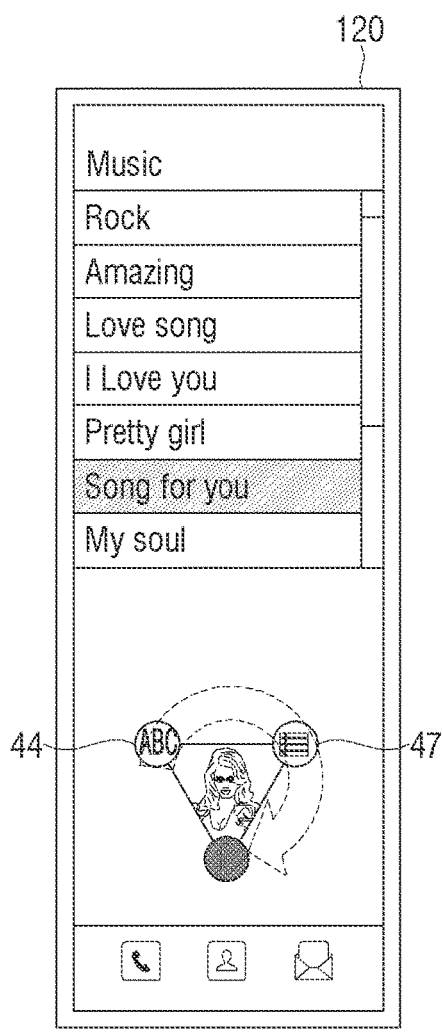
Figure 10B:

FIGS. 10A and 10B illustrate a method of controlling a display apparatus by using a polygonal object according to another embodiment of the present disclosure.

Referring to FIGS. 10A and 10B, if a manipulation of touching an apex 44 for an item arrangement to rotate the polygonal object is detected when a scrollable list is displayed on the display unit 120, the controller 130 may control the display unit 120 to re-arrange items included in the scrollable list according to an arraignment criterion mapped onto the apex 44.

For example, if the arrangement criterion mapped onto the apex 44 is an alphabetic order, a list of song titles may be re-arranged in the alphabetic order as shown in FIGS. 10A and 10B. As another example, if a manipulation of touching an apex 47 for a category arrangement to rotate the polygonal object is detected, the controller 130 may control the display unit 120 to re-arrange and display a list of songs according to genres, such as hip-hop, rap, classic, and the like.

Figure 11:
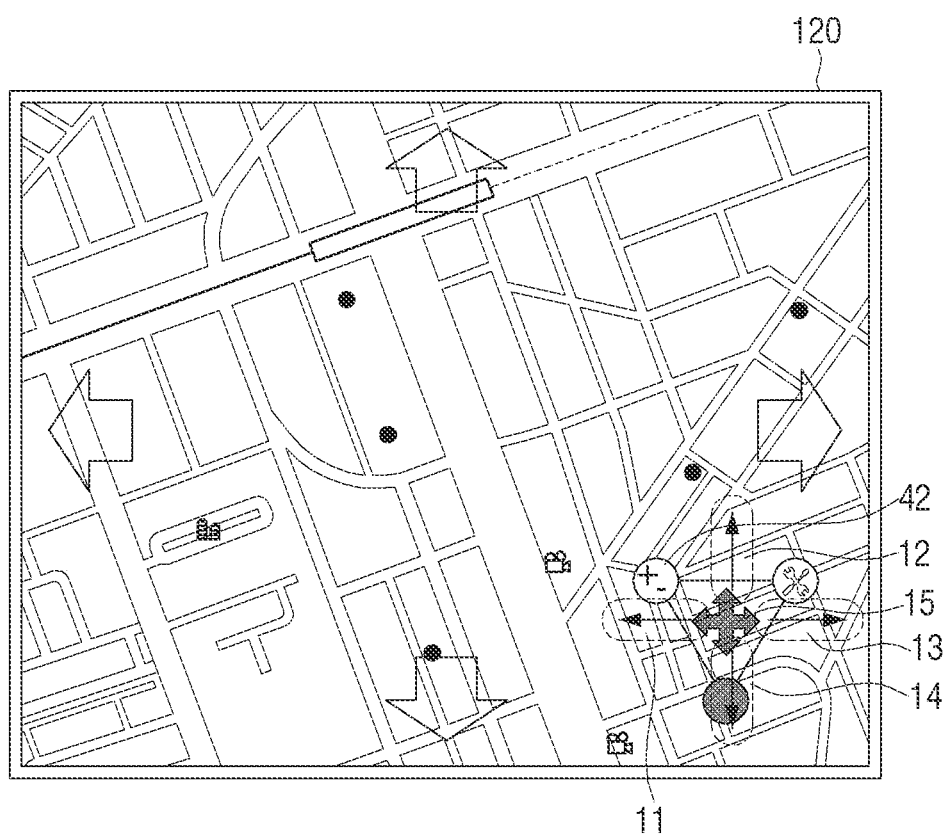

FIG. 11 illustrates a method of controlling a display apparatus by using a polygonal object according to another embodiment of the present disclosure.

Referring to FIG. 11, if a touch manipulation heading from a center of the polygonal object toward an outside of the polygonal object is detected, the controller 130 may control the display unit 120 to move a screen according to a direction of the touch manipulation.

For example, as shown in FIG. 11, if a manipulation 11 of touching the screen from the center of the polygonal object to the left side is detected, the controller 130 may control the display unit 120 to move the screen to the left side. If a manipulation 12 of touching the screen from the center of the polygonal object upwards is detected, the controller 130 may control the display unit 120 to move the screen upwards. If a manipulation 13 of touching the screen from the center of the polygonal object to the right side is detected, the controller 130 may control the display unit 120 to move the screen to the right side. If a manipulation 14 of touching the screen from the center of the polygonal object downwards is detected, the controller 130 may control the display unit 120 to move the screen downwards. However, the movements of the screen are not limited to left, right, upward, and downward directions, and thus the controller 130 may control the display unit 120 to move the screen in a detected touch direction.

In this case, the polygonal object may include an arrow 15, which informs a user that a manipulation of moving the screen is possible, in the center thereof as shown in FIG. 11. In addition, if the user touches the arrow 15 of the polygonal object, a guide line for guiding a touch manipulation to the outside of the polygonal object may be displayed.

Referring to FIG. 11, if a manipulation of touching and rotating an apex 42 for zooming in or out is detected, the controller 130 may control the display unit 120 to zoom the screen in or out according to the rotation direction. The zooming in indicates that the screen is enlarged based on a center of the screen that is currently displayed, and the zooming out indicates that the screen is reduced.

According to another embodiment of the present disclosure, a function of displaying a menu provided from a currently executed application may be mapped onto a particular apex of the polygonal object.

Figure 12A:
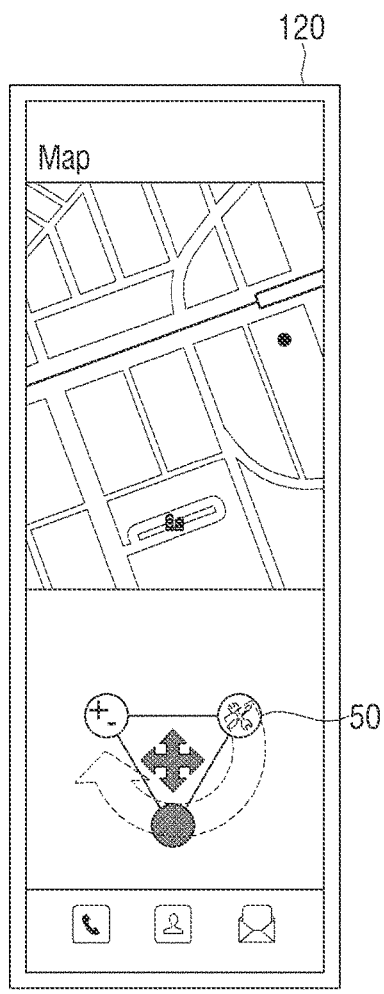
Figure 12B:
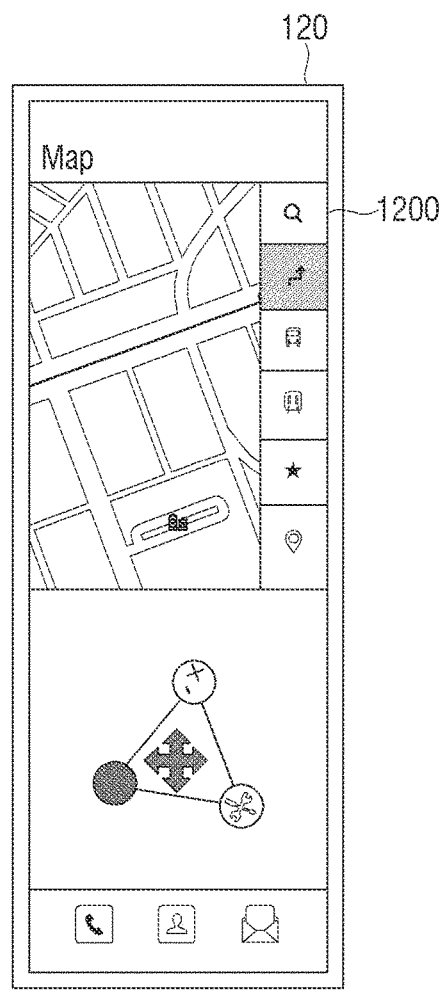

FIGS. 12A and 12B illustrate a method of controlling a display apparatus by using a polygonal object according to another embodiment of the present disclosure.

Referring to FIGS. 12A and 12B, if a manipulation of touching and rotating an apex 50 for displaying a function menu is detected, the controller 130 may display a function menu 1200. For example, if a map application is being executed, a function menu, such as searching, way finding, a bus line, a subway line, or the like provided by the map application may be displayed. If a manipulation of touching and rotating the apex 50 is continuously detected after the function menu is displayed, the controller 130 may control the display unit 120 to sequentially highlight and display items of the function menu according to the rotation direction. In addition, if a center of the polygonal object is touched, the controller 130 may perform a function mapped onto a highlighted item.

According to the above-described various embodiments of the present disclosure, the polygonal object may be usually reduced and displayed on the display unit 120 and then may be enlarged when the user wants to enlarge the polygonal object.

FIGS. 13A and 13B illustrate a method of controlling a display apparatus by using a polygonal object according to another embodiment of the present disclosure.

Referring to FIG. 13A, for example, an object 1301 to which a polygonal object is reduced is displayed in a fixed area 1300 of a home screen that does not change a display despite a user manipulation. Referring to FIG. 13B, if a user manipulation of dragging the object 1301 into a home screen area or a user manipulation of touching the object 1301 is detected, the polygonal object may be enlarged and displayed in the home screen area. In this case, an animation of turning the polygonal object round and round to enlarge the polygonal object may be played.

On the contrary, if a user manipulation of dragging the polygonal object into the fixed area 1300 is detected, the polygonal object may be reduced again.

FIGS. 14A, 14B, 14C, and 14D illustrate a method of controlling a display apparatus by using a polygonal object according to another embodiment of the present disclosure.

Referring to FIGS. 14A and 14B, the controller 130 may reduce a polygonal object and place the reduced polygonal object at an edge of a screen according to a user manipulation.

Referring to FIGS. 14C and 14D, if a user manipulation of dragging the reduced polygonal object is detected, a position of the reduced polygonal object may be changed. As described above, screen covering occurring due to the polygonal object may be minimized.

As described above, a size and a position of a polygonal object may be changed according to user manipulations. In addition, according to another embodiment of the present disclosure, a color, a transparency, and the like, of the polygonal object may be changed. Alternatively, the controller 130 may change at least one selected from the size, the color, the transparency, the position, and the number of apexes of the polygonal, and a function mapped onto the apex according to a currently executed application. This change option may be set by the user.

For example, if the currently executed application is a phone directory application, the controller 130 may control the display unit 120 to display a triangular object including an apex for basic scrolling, an apex for displaying a recent call list, and an apex for displaying a list of bookmarked contact numbers. If the currently executed application is an application for playing a media content, the controller 130 may control the display unit 120 to display a square object including an apex for basic scrolling, an apex for fast-forwarding, an apex for rewinding, and an apex for a volume adjustment.

More particularly, if an application for playing a moving picture is executed, the controller 130 may transparently display a polygonal object to minimize covering of the moving picture.

Figure 15A:
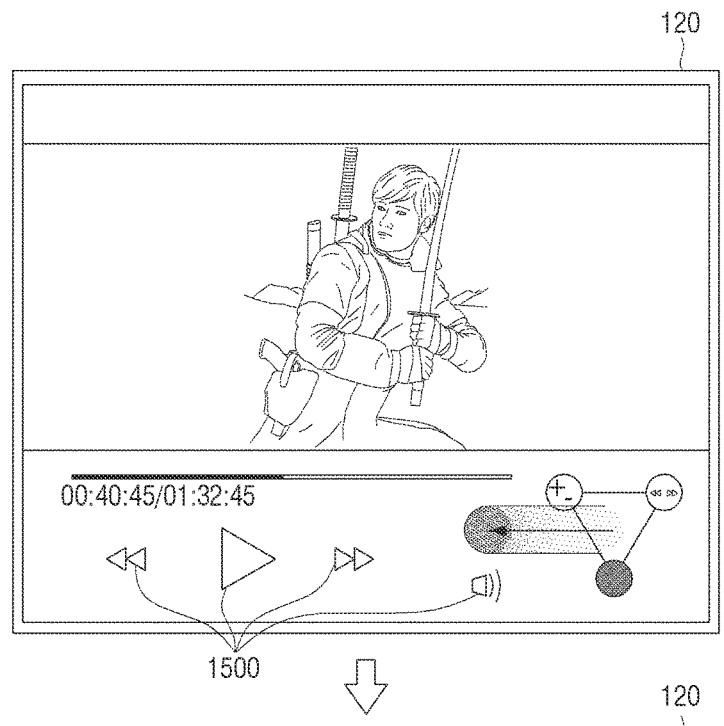
Figure 15B:
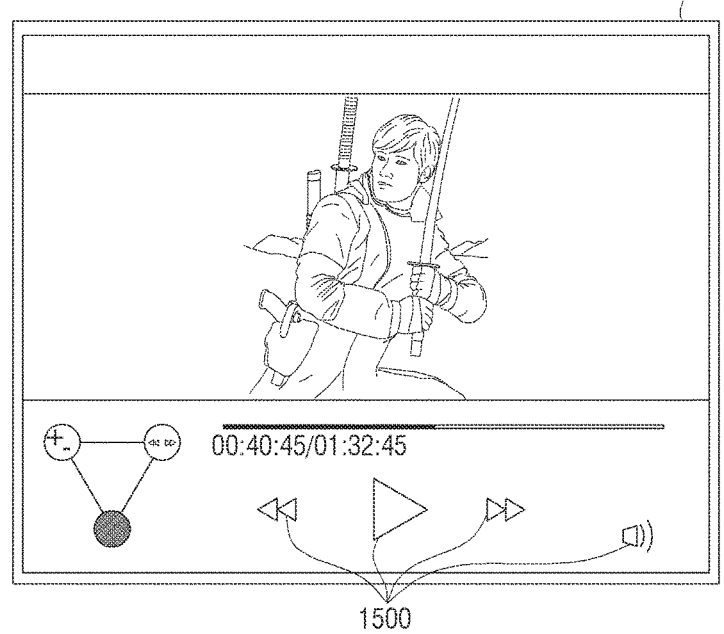

FIGS. 15A and 15B illustrate a method of controlling a display apparatus by using a polygonal object according to another embodiment of the present disclosure.

According to an embodiment of the present disclosure, the controller 130 may change a layout of a screen according to a movement of a polygonal object in order to minimize covering of the screen.

Referring to FIGS. 15A and 15B, if a manipulation of moving a polygonal object is detected as illustrated in FIG. 15A, the controller 130 may change a position of the polygonal object and simultaneously change positions of manipulation buttons 1500 that are displayed on a screen, as illustrated in FIG. 15B. According to an embodiment of the present disclosure, since the polygonal object operates as a kind of manipulation button, an overlap between another manipulation button displayed on the screen and the polygonal object may be avoided.

Figure 16:
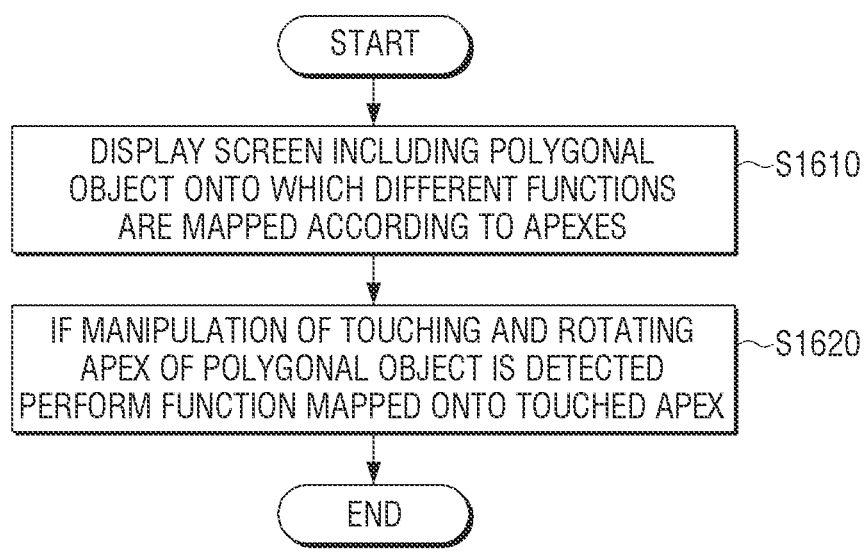
FIG. 16 is a flowchart illustrating a method of controlling a display apparatus according to an embodiment of the present disclosure.

FIG. 16 is a flowchart illustrating a method of controlling a display apparatus according to an embodiment of the present disclosure.

Referring to FIG. 16, in operation S1610, the controller 130 displays a screen, including a polygonal object onto which different functions are mapped according to apexes, on the display unit 120.

In operation S1620, if a manipulation of touching one of a plurality of apexes of the polygonal object to rotate the polygonal object is detected through the detecting unit 110, the controller 130 performs a function mapped onto the touched apex. In this case, the controller 130 may perform the mapped function based on the touched apex, a rotation direction, and a rotation angle.

The controller 130 may give various effects to the polygonal object. For example, when a user touches and rotates the polygonal object, the polygonal object may be actually rotated according to a user touch. However, when a touch manipulation is performed, the polygonal object does not need to be rotated and may be displayed in a fixed state.

If a manipulation of touching and flicking an apex of the polygonal object is detected, the controller 130 may continuously rotate and display the polygonal object. If a scrolling function is mapped onto a touched apex, the controller 130 may control the display unit 120 to stop rotating of the polygonal object when reaching bottom or top of the screen.

In addition, various methods of controlling the display apparatus 100 may be inferred according to various embodiments described with reference to FIGS. 1 through 15B, and thus their repeated descriptions are omitted.

According to the display apparatus 100 that displays a polygonal object as described above, the user may control the display apparatus 100 with one hand. In addition, since various different functions are mapped onto an apex of the polygonal object, diversity of manipulating may be provided.

According to various embodiments of the present disclosure as described above, a user may further intuitively control an apparatus and manipulate the apparatus with one hand.

A method of controlling a display apparatus according to the above-described various embodiments may be stored on a non-transitory computer-readable medium. The non-transitory computer-readable medium may be installed and used on various types of devices.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

Therefore, the above-described program may be installed on an existing display apparatus to provide a user with various manipulations using a polygonal object as described above.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A display apparatus comprising:
   a display which displays a screen comprising a polygonal object onto which different functions are mapped to each apex of the polygonal object;
   a sensor; and
   at least one processor configured to, in response to a manipulation that touches one of the apexes of the polygonal object and rotates the polygonal object being detected by the sensor, control the display to display the rotated polygonal object according to the manipulation and perform a function mapped onto the touched apex,
   wherein the at least one processor is further configured to, in response to a manipulation that changes a shape of the polygonal object, change a number of apexes of the polygonal object, and
   wherein the at least one processor is further configured to, in response to a touch manipulation heading from a center of the polygonal object to an outside of the polygonal object, control the display to move the screen according to a direction of the touch manipulation.

2. The display apparatus of claim 1, wherein the at least one processor is further configured to perform a function corresponding to:
   the touched apex,
   a rotation direction, and
   a rotation angle of the polygonal object.

3. The display apparatus of claim 2, wherein the at least one processor is further configured to, in response to a manipulation that touches and rotates a first apex of the apexes of the polygonal object, scroll the screen in a direction corresponding to the rotation direction.

4. The display apparatus of claim 2,
   wherein the screen comprises a scrollable list, and
   wherein the at least one processor is further configured to, in response to a manipulation that touches and rotates a first apex of the apexes of the polygonal object, control the display to sequentially highlight items comprised in the scrollable list in a direction corresponding to the rotation direction.

5. The display apparatus of claim 2, wherein the at least one processor is further configured to, in response to a manipulation that touches and rotates a first apex of the apexes of the polygonal object, zoom the screen in or out according to the rotation direction.

6. The display apparatus of claim 4, wherein the at least one processor is further configured to:
   display an image, which represents the highlighted item, in the polygonal object, and
   perform, in response to the displayed image being selected, a function mapped onto an item corresponding to the selected image.

7. The display apparatus of claim 4,
wherein the at least one processor is further configured to, in response to a first list being displayed and a manipulation that touches and rotates a second apex of the apexes of the polygonal object, control the display to change the first list into a second list comprising only a set item, and
wherein the first list comprises all the items.

8. The display apparatus of claim 4, wherein the at least one processor is further configured to, in response to a manipulation that touches and rotates a second apex of the apexes of the polygonal object, control the display to re-arrange items comprised in the scrollable list according to an arrangement criterion mapped onto the second apex.

9. The display apparatus of claim 1,
wherein the screen comprises a page screen displayed in a unit of pages, and
wherein the at least one processor is further configured to, in response to a manipulation that touches and rotates a first apex of the apexes of the polygonal object, control the display to display a previous page screen or a next page screen according to a direction for touching and rotating the first apex.

10. The display apparatus of claim 1, wherein the at least one processor is further configured to change at least one selected from a size, a color, a transparency, a position, the number of apexes of the polygonal object, or a function mapped onto the apex, the change being according to an application that is currently executed on the display apparatus.

11. The display apparatus of claim 1,
wherein the polygonal object comprises a triangle comprising first, second, and third apexes, and
wherein the at least one processor is further configured to:
perform a first function in response to a manipulation that touches and rotates the first apex,
perform a second function different from the first function in response to a manipulation that touches and rotates the second apex, and
perform a third function different from the second function and the first function in response to a manipulation that touches and rotates the third apex.

12. The display apparatus of claim 1, wherein characters or icons for indicating functions respectively mapped onto the apexes of the polygonal object are displayed on the apexes of the polygonal object.

13. A method of controlling a display apparatus, the method comprising:
displaying a screen comprising a polygonal object onto which different functions are mapped to each apex of the polygonal object;
in response to a manipulation that touches one of the apexes of the polygonal object and rotates the polygonal object being detected by a sensor, displaying the rotated polygonal object according to the manipulation and performing a function mapped onto the touched apex;
in response to a manipulation that changes a shape of the polygonal object, changing a number of apexes of the polygonal object; and
in response to a touch manipulation which heads from a center of the polygonal object to an outside of the polygonal object, moving the screen according to a direction of the touch manipulation and displaying the moved screen.

14. The method of claim 13, wherein the performing of the function comprises performing a function corresponding to:
the touched apex, and
a rotation direction and angle of the polygonal object.

15. The method of claim 14, wherein the performing of the function comprises, in response to a manipulation that touches and rotates a first apex of the apexes of the polygonal object, scrolling the screen in a direction corresponding to the rotation direction.

16. The method of claim 14,
wherein the screen comprises a scrollable list, and
wherein the performing of the function comprises, in response to a manipulation that touches and rotates a first apex of the apexes of the polygonal object, sequentially highlighting and displaying items comprised in the scrollable list in a direction corresponding to the rotation direction.

17. The method of claim 16, further comprising:
displaying an image, which represents the highlighted item, in the polygonal object; and
performing, in response to the displayed image being selected, a function mapped onto an item corresponding to the selected image.

18. The method of claim 16, wherein, in response to a first list being displayed and a manipulation that touches and rotates a second apex of the apexes of the polygonal object, changing the first list into a second list comprising only a set item.

19. The method of claim 16, wherein, in response to a manipulation that touches and rotates a second apex of the apexes of the polygonal object, re-arranging items comprised in the scrollable list according to an arrangement criterion mapped onto the second apex.

20. The method of claim 16, wherein, in response to the manipulation that touches and rotates the first apex of the apexes of the polygonal object, zooming the screen in or out according to the rotation direction.

21. The method of claim 13,
wherein the screen comprises a page screen displayed in a unit of pages, and
wherein, in response to a manipulation that touches and rotates a first apex of the apexes of the polygonal object, displaying a previous page screen or a next page screen according to a direction of touching and rotating the first apex.

22. At least one non-transitory computer-readable storage medium configured to store a computer program of instructions readable by at least one processor that configure the at least one processor to execute a computer process for performing the method of claim 13.

* * * * *